Patented Feb. 10, 1953

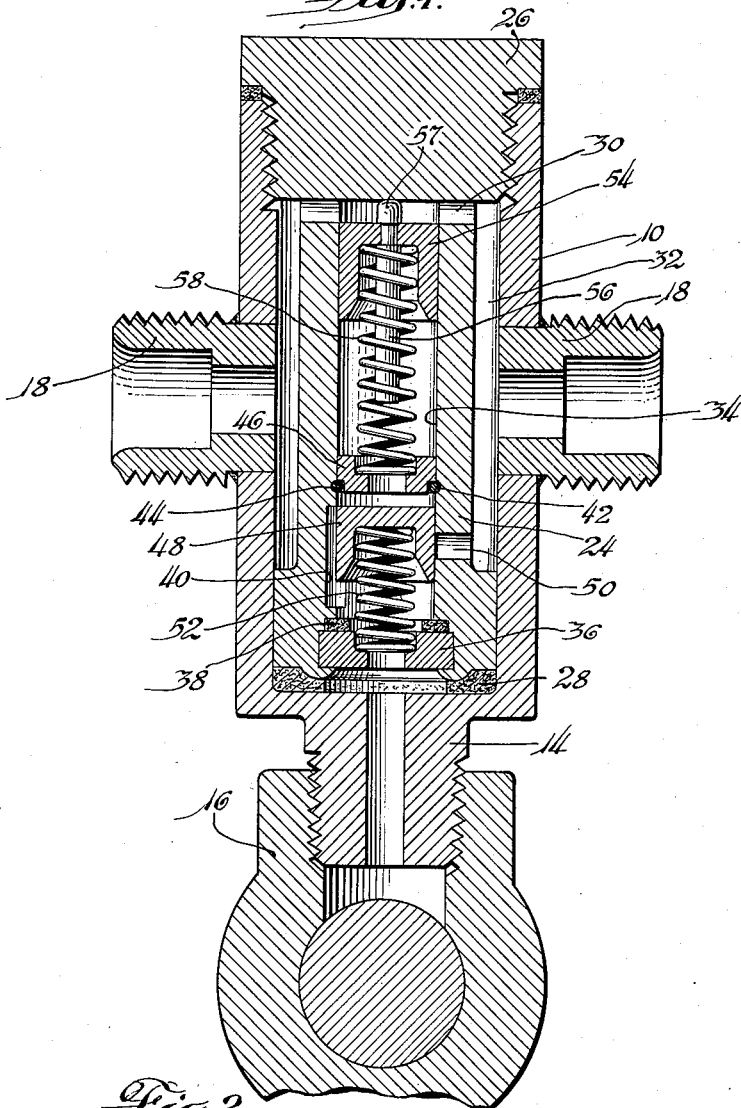
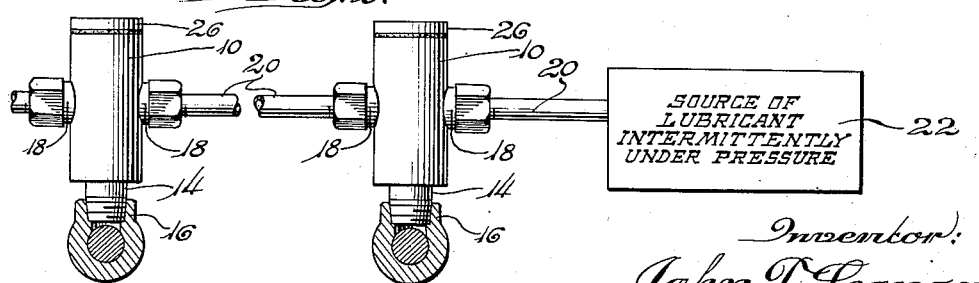

2,627,939

UNITED STATES PATENT OFFICE 2,627,939

LUBRICANT FEEDER VALVE FOR CENTRALIZED LUBRICATING SYSTEMS

John T. Leonard, Evanston, Ill., assignor to Stewart-Warner Corporation, Chicago, Ill., a corporation of Virginia Application June 21, 1949, Serial No. 100,424

6 Claims. (Cl. 184—7)

My invention relates generally to lubricating apparatus, and more particularly to improvements in feeder valves forming parts of centralized lubricating systems.

It is an object of the invention to provide an improved lubricant feeder valve which, when intermittently supplied with lubricant under pressure, will discharge accurately measured amounts of lubricant into a bearing or other part to be lubricated.

A further object is to provide an improved measuring or feeder valve in which bypassing of the lubricant past the measuring piston is avoided, so that upon each operation an accurately measured charge of lubricant will be supplied to the bearing to be lubricated.

Other objects and advantages will appear from the following description, reference being had to the accompanying drawings, in which:

Fig. 1 is a central vertical sectional view of the improved measuring or feeder valve, illustrated as applied to a bearing to be supplied with lubricant; and Fig. 2 is an elevational view showing the manner in which several of the feeder valves may be connected together and to a source of lubricant under pressure to form a centralized lubricating system.

The feeder valve comprises a generally hollow cylindrical body 10 having a threaded shank portion 14 for attachment to a bearing 16 representative of any part to which measured quantities of lubricant are to be supplied.

The body 10 has a pair of nipples 18 welded, brazed, or otherwise suitably secured thereto, these nipples being formed for a coupling connection with conduits 20 as shown in Fig. 2. Lubricant is supplied to the various feeder valves from a suitable source 22 of lubricant, which intermittently supplies lubricant under high pressure to the conduit system and then relieves the pressure.

A measuring cylinder 24 is secured within the body 10 by a threaded plug 26. A gasket 28 effects a seal between the lower end of the measuring cylinder 24 and the lower end of the body 10, the upper end of the cylinder 24 having a kerf 30 providing passageways from the annular space 32 between the outer wall of the cylinder 24 and the inner wall of the body 10.

The cylinder 24 is provided with a central bore 34. The lower end of the bore 34 is enlarged to receive an apertured spring seat 36 which also serves as a backing for a valve seat 38 and is clamped in place by curling inwardly the lower edge of the cylinder 24. The cylinder 24 is provided with an offset bypass 40 which may be milled in the cylinder wall, and is provided with an internal annular groove 42 for the reception of a split resilient retainer ring 44, the latter serving as an abutment for a spring seat 46. A cylindrical inverted cup-shaped valve 48 normally covers a radial passageway or port 50 formed in the wall of the cylinder 24 opposite the bypass 40, the valve 48 being held in its upper position, closing the port 50, by a compression coil spring 52.

A piston 54 has a stem 56 riveted thereto and is reciprocable in the upper end of the bore 34, being normally held in its uppermost position by a compression coil spring 58 which surrounds the stem 56 and abuts against the seat 46, the projecting rivet head 57 of the stem serving to hold the upper end face of the piston 54 spaced slightly from the inner end surface of the plug 26.

In operation of the feeder valve, lubricant under pressure is supplied for a predetermined time interval from the source 20, this lubricant flowing through the space 32 and kerfs 30 to the upper end of the bore 34, thereby exerting a downward pressure on the piston 54 to compress the spring 58 and force the lubricant contained within the upper end of the bore downwardly through the spring seat 46 and through the bypass 40 around the valve 48 and through the spring seat 36 and shank 14 to the bearing to be lubricated, it being understood that the lubricant pressure beneath the piston 54 will force the valve 48 downwardly sufficiently to permit the flow of lubricant past this valve through the bypass 40.

As the piston 54 approaches the end of its stroke, the lower end of its stem 56 engages the valve 48 and forces the latter downwardly to cut off the bypass 40, the valve 48 being thus forced against its seat 38. As the valve 48 moves downwardly, it partially uncovers the port 50 as the bypass 40 is closed off, and when the valve 48 has been pressed against its seat 38, lubricant may flow freely into the bore 34 through the port 50, thereby balancing the lubricant pressure on the piston 54 and permitting the latter to return to its normal uppermost position, as shown in Fig. 1, under the influence of its return spring 58.

The various feeder valves are thus operated to discharge measured quantities of lubricant to the bearings to which they are connected, and after sufficient time has elapsed for all of the feeder valves to have been operated, the lubricant pressure in the system is relieved, whereupon the valves 48 are permitted to return to their normal positions, as shown in Fig. 1, under the influence of their springs 52. Such movement of the valves 48 is permitted by virtue of the by-passing of lubricant around these valves through the bypasses 49. After all of the valves 48 have returned to their normal positions, the system is in condition for the next operation.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A feeder device for lubricating systems in which measured charges of lubricant are supplied from a source to the bearing upon alternate application and relief of lubricant pressure to the feeder device, the combination of means forming a cylinder having a port intermediate the ends thereof, means for connecting the upper end of the cylinder to the source of lubricant, means exterior of the cylinder for connecting the port to the source, a piston reciprocable in the cylinder between the upper end thereof and the port, a valve normally in a position closing the cylinder slightly above the port and covering the port, a spring effective to hold the valve in its normal position, a passageway around the valve located so as to conduct lubricant around the valve when the latter is displaced slightly from its normal position, and means including an apertured valve seat engageable by the valve to control flow of lubricant from the device to a part to be lubricated, said seat being spaced sufficiently from the port to cause the latter to be uncovered by the valve when the valve has been moved in opposition to its spring a sufficient distance to cause it to engage said seat.

2. A feeder device for lubricating systems in which measured charges of lubricant are supplied from a source to a bearing upon alternate application and relief of lubricant pressure to the feeder device, the combination of means forming a cylinder having a port intermediate the ends thereof, means for connecting the upper end of the cylinder and the port to the source of lubricant, a piston reciprocable in the cylinder between the upper end thereof and the port, a valve normally in a position closing the cylinder slightly above the port and covering the port, a spring effective to hold the valve in its normal position, a passageway around the valve located so as to conduct lubricant around the valve when the latter is displaced slightly from its normal position, and means including an apertured valve seat engageable by the valve to control flow of lubricant from the device to a part to be lubricated, said seat being spaced sufficiently from the port to cause the latter to be uncovered by the valve when the valve has been moved in opposition to its spring a sufficient distance to cause it to engage said seat.

3. A lubricant feeder device of the class described comprising, a body having an inlet for connection to a conduit in which the lubricant is placed under pressure and in which the pressure is subsequently relieved, said body having an outlet for connection to a part to be supplied with lubricant, a cylinder within the body and having one end in communication with the inlet port, there being a port leading from the inlet port to a point intermediate the ends of the cylinder, a piston reciprocable in the cylinder and located in a part thereof between the port and the end of the cylinder which is connected to the inlet, a cylindrical valve reciprocable in the other end of the cylinder, a spring normally to hold said valve in position closing the port, a seat around the outlet for engagement by the valve when the latter is moved away from the port against the force applied by the spring, and means providing a passageway for the flow of lubricant around the valve to the outlet port when the valve is in substantially normal position, whereby upon application of lubricant under pressure to the inlet the piston will be moved in its cylinder toward the port, the valve will be moved sufficiently to uncover the passageway to permit flow of the lubricant to the outlet upon the movement of the piston, then uncover the port, and thereafter will be moved to a position engaging the seat around the outlet to stop flow of lubricant through the outlet, said valve by uncovering the port, permitting flow of lubricant from the inlet through the port to the cylinder and thereby effect the return of the piston to its normal position.

4. In a lubricant feeder valve for supplying measured charges of lubricant to a bearing upon having lubricant from a source under pressure intermittently supplied thereto, the combination of a body element having a cylinder positioned therein, a spring returned piston reciprocable in said cylinder and initially positioned at one end thereof, said piston carrying an actuating part, said cylinder having a bore in communication with said body, means forming an outlet passageway connecting the bore to a bearing to be lubricated, said cylinder having a port intermediate the ends thereof, means for conducting lubricant from the source to one end of the piston and to said port, a spring returned valve member in said bore normally closing said port, a seat around the outlet passageway for engagement by the valve when the latter is moved away from the port against the force applied by the spring, and means forming a bypass around the valve when the valve is displaced slightly from its normal position, whereby, when lubricant under pressure is supplied to the cylinder, the piston therein will be moved against the force of its spring and upon discharging a predetermined quantity of lubricant past the valve through the bypass and outlet passageway to the bearing, will cause said actuating part to engage said valve to move the latter to a position uncovering said port and engaging said seat, thereby cutting off communication between the bore and the outlet passageway so that lubricant may flow through said port to refill the cylinder and cause the piston to return to its initial position.

5. In a lubricant feeder valve for centralized lubricating systems in which lubricant is intermittently supplied from a source to the feeder under pressure and in which the pressure is relieved between the periods of pressure application, the combination of a body having an inlet for connection to the source of lubricant and an outlet for connection to a part to be lubricated; means forming a measuring cylinder having one end thereof connected to the inlet; a spring returned piston reciprocable in the cylinder; means forming a cylindrical valve chamber having one end connected to the end of the cylinder opposite the end thereof which is connected to the inlet, the other end of the chamber being connected to the outlet; means forming a port connecting the inlet to the valve chamber at a point remote from the outlet; a piston valve reciprocable in the chamber; a seat for said piston valve around said outlet; a spring normally holding the piston valve away from said seat and in position closing the port; means forming a passageway for conducting lubricant around the piston valve to the outlet when the piston valve is in substantially normal position; and mechanical means operable by the piston to move the valve into engagement with said seat, thereby uncovering the port and closing the passageway when the piston has substantially completed its operative stroke against the force of its spring.

6. In a lubricant feeder valve for centralized lubricating systems in which lubricant is intermittently supplied from a source to the feeder under pressure and in which the pressure is relieved between the periods of pressure application, the combination of a body having an inlet for connection to the source of lubricant and an outlet for connection to a part to be lubricated; means forming a measuring cylinder having one end thereof connected to the inlet; a spring returned piston reciprocable in the cylinder; means forming a cylindrical valve chamber having one end connected to the end of the cylinder opposite the end thereof which is connected to the inlet, the other end of the chamber being connected to the outlet; means forming a port connecting the inlet to the valve chamber at a point remote from the outlet; a piston valve reciprocable in the chamber; a seat for said piston valve around said outlet; a spring normally holding the piston valve away from said seat and in position closing the port; a passageway for conducting lubricant around the piston valve and into the outlet when the piston valve is in substantially normal position; and means operable by the piston when it has substantially completed its operative stroke, to cause the piston valve to engage the seat, thereby uncovering the port and closing the outlet.

JOHN T. LEONARD.

REFERENCES CITED

The following references are of record in the file of this patent:

UNITED STATES PATENTS

| Number | Name | Date |
|---|---|---|
| 2,141,022 | Rotter | Dec. 20, 1938 |
| 2,205,320 | Teal | June 18, 1940 |